April 22, 1958  C. R. BACCA  2,831,622
MOTOR VEHICLE SPARE WHEEL LOCKING ASSEMBLY
Filed Aug. 1, 1955
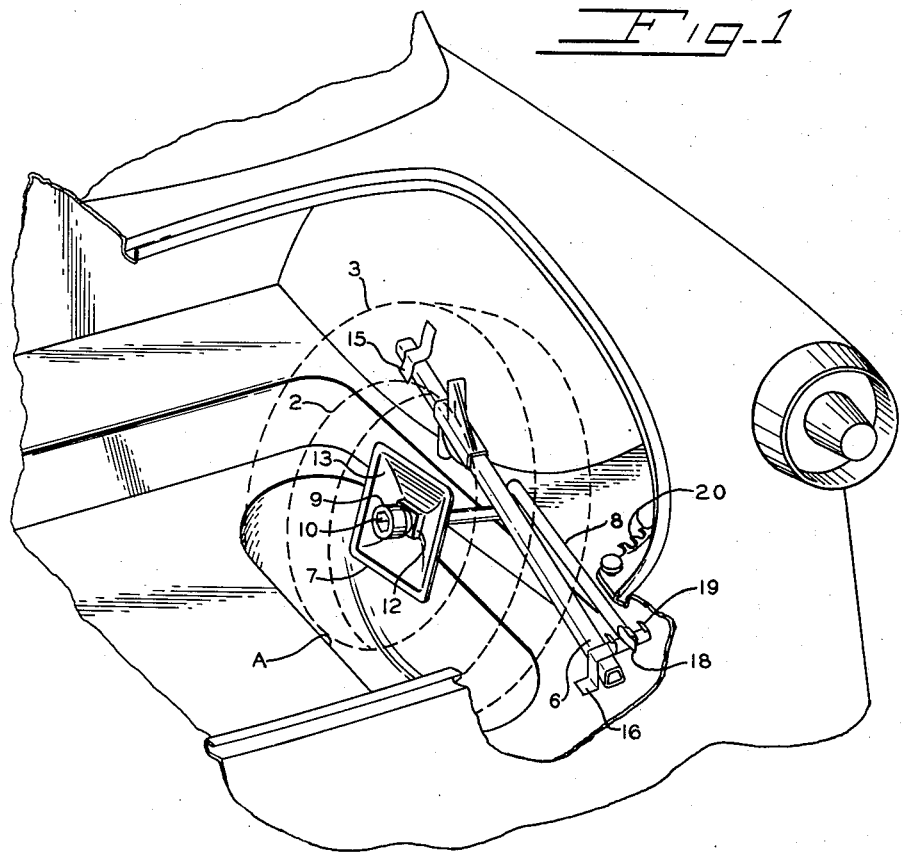
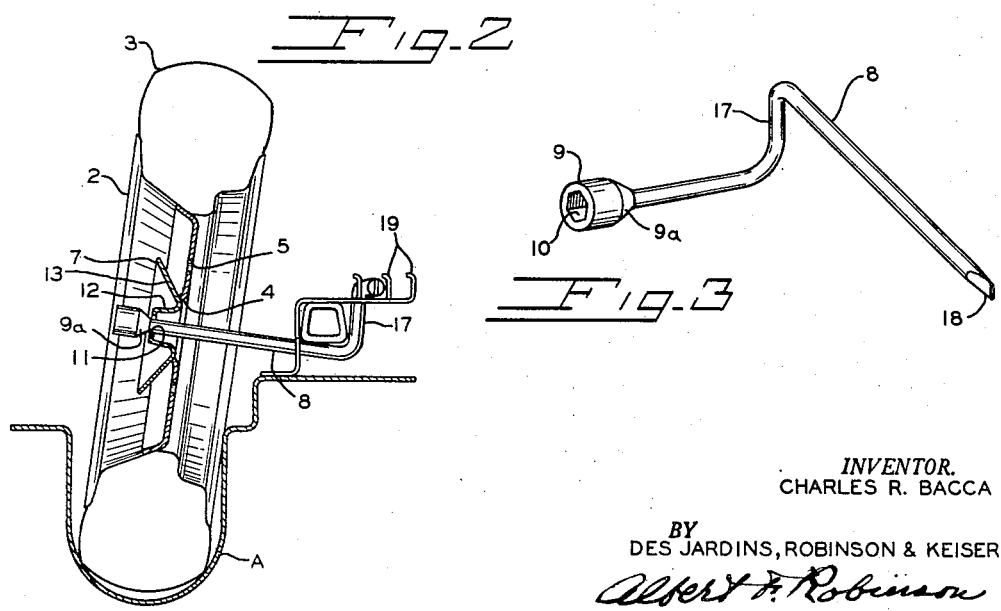
INVENTOR.
CHARLES R. BACCA
BY
DES JARDINS, ROBINSON & KEISER
HIS ATTORNEYS

United States Patent Office 2,831,622
Patented Apr. 22, 1958

2,831,622

MOTOR VEHICLE SPARE WHEEL LOCKING ASSEMBLY

Charles R. Bacca, Milford, Ohio

Application August 1, 1955, Serial No. 525,530

8 Claims. (Cl. 224—42.24)

This invention relates to a motor vehicle spare wheel locking assembly, and pertains particularly to a locking assembly comprised of any conventional vehicle lifting jack, with or without the base thereof, and its bell crank which is also a wrench for the mounting wheel nuts. The jack is fixed in place in any suitable way adjacent one side of the spare wheel for the wheel to be clamped thereagainst by the jack crank fulcrumed to clamping position. One end of the jack crank is detachably connected to the wheel, and its opposite end is detachably latched in clamping position.

The spare wheel is now conventionally mounted in the motor vehicle trunk compartment by means of a bolt pivotally fitted at one end in the trunk in position for its free end to be projected through the central hub or axle opening, or one of the bolt openings, and then provided with some readily detachable means on the projected end for clamping the wheel securely in place. This readily detachable means may be simply a nut screwed to the projecting free end of the bolt if the bolt is projected through one of the wheel mounting bolt openings. However, if projected through the larger axle or hub opening, a clamp means of greater area than a conventional nut is required to span the opening. This may be a special plate, or the conventional base plate of the lifting jack which is ordinarily detachably connected with the bottom end of the jack. The bolt extends through a perforation in the plate and the nut abuts the plate. A perforation is in the base plate for inserting the bottom end of the jack. In addition to this special means for clamping the spare wheel in place, additional means are usually provided for fastening the jack in the trunk so that it will not be loose to rattle about. Both of these means for securing the spare wheel and the jack in place in the trunk compartment are not only additional accessories, adding to the labor and material costs, but they are separate and independent. Moreover, in some instances a bracket is fixed to the trunk in position for the wheel to be abutted thereagainst when clamped as above described.

Accordingly one of the principal objects of the invention is utilizing the lifting jack and its crank for detachably clamping the spare wheel in the trunk compartment.

Another object of the invention is detachably attaching the spare wheel with the conventional tools provided for jacking up the motor vehicle.

Another object of the invention is a spare wheel clamping means which is simple in construction and efficient in operation.

Still another object of the invention is to provide a common spare wheel clamping means and a lifting jack without additional means other than may be necessary for securing the jack in place in the trunk compartment and latching the crank.

Further objects, and objects relating to details of construction and economies of operation, will readily appear from the detailed description to follow. In one instance, the objects of the invention have been accomplished by the device and means set forth in the following specification. The invention is clearly defined and pointed out in the appended claims. A structure constituting a preferred embodiment of the invention is illustrated in the accompanying drawings, forming a part of the specification in which:

Fig. 1 is a perspective view of a motor vehicle trunk compartment opening and a spare wheel locked in place by a locking assembly embodying the invention.

Fig. 2 is a vertical sectional view through the spare wheel and locking assembly.

Fig. 3 is a detail view of the bell crank of the lifting jack constructed to have one end attached to the wheel and the bell portion fulcrumed to a jack disposed at one side of the wheel.

Referring specifically to the drawings in which like numerals designate like parts, numeral 2 is a conventional motor vehicle disc wheel having a tire 3 mounted on its rim. The central or hub portion of the wheel is recessed to provide an opening 4 for receiving the end of the wheel axle or a hub adapted to be fitted thereto for being bolted in place by mounting bolts projecting through a series of bolt receiving openings 5 disposed about the larger central opening 4. The trunk floor is usually recessed, as at A, to receive the bottom portion of the wheel.

The conventional motor vehicle lifting jack has a detachable base 7, which is of greater area than the opening 4 in the wheel. The lifting jack is operated by a bell crank or lever 8 having an enlarged head 9 on one end in which a non-circular socket 10 is formed for receiving the wheel mounting nuts so that this crank or lever may also be used as a wrench for removing and applying the wheel clamping nuts. This lifting jack 6 may be more generally referred to as a bar since it typifies any means that might be used for this purpose. All that is necessary is some member secured in the trunk compartment adjacent the wheel on which the crank is adapted to be fulcrumed.

This lever or crank 8 is projected through a perforation 11 in the lifting jack base 7, with the conical shoulder 9a of its enlarged head 9 engaging the margin of said perforation 11, and the jack base 7 is fitted against the side of the wheel and spanning its central opening 4. The jack base 7 is embossed with a central hub portion 12 surrounded by a dished portion 13, and either side face can be abutting against the wheel to hold the end of the crank.

The lifting jack 6 is detachably secured in the trunk by any suitable means, such as by cleats or brackets 15 and 16, in position to provide a fulcrum point for the intermediate bent portion 17 of the bell crank or lever 8. Cleats 15 and 16 typify any suitable means for detachably fastening the jack adjacent its opposite ends when placed on the bottom of the trunk at one side of the wheel. They are simply angle brackets secured to the trunk floor for detachably holding said jack securely in place. The jack is advantageously utilized as the means for fulcruming the crank, and it could well be sufficiently secured by being simply fitted to the bottom or floor of the trunk.

The invention is not limited to any particular manner in which the jack is secured in the trunk, and it need only be secured against lateral displacement. It could be simply dropped into recesses in the trunk bottom as the weight of the jack would be sufficient to hold it down, but it is preferably fastened down, as well as fastened against lateral displacement, if such be desired for holding it secured down. One end of the jack is inserted in the opening formed by cleat 15, and then its opposite end is fitted into the socket of bracket 16.

Means is provided in position on the trunk for latching the free end 18 of the crank or lever 8, and said means may advantageously be a series of ledges 19. The crank or lever 8, while rigid, has sufficient give or flexibility to be sprung into engagement with one of the ledges 19. The lifting jack and crank or lever are preferably disposed so that the free end of the crank or lever is moved vertically in being fulcrumed against the jack and thereby is more accessible. The amount of leverage can be regulated by the angle at which the jack is laid along the side of the wheel or by the angle of the bent portion 17. These may be readily adjusted for the trunks of different cars.

The invention is not limited to any particular latching means for detachably securing the free end of the lever or crank. In fact, the latch is not essential, but is preferable since it assures the lever or crank being secured in clamped position. Merely serrating the bent intermediate portion 17 of the crank or the jack where they are in contact for fulcruming the crank would also provide for latching said crank in clamping position, this serrating being in addition to or in lieu of the ledges 19. The bent portion 17 of the crank may be disposed at any angle to determine the leverage as its free end is pushed down to engage one of the ledges.

The latching means for the crank may be separate from the bracket, and alternative latching ledges 20 are disclosed fixed to some other portion of the trunk. These are disposed to engage the crank somewhere between its free end and the bent portion 17, and the end of the crank can be disposed at the proper angle from the bent portion 17 to be engaged by these latching ledges 20 in lieu of latching ledges 19.

This invention is not limited to any particular sequence for placing the spare wheel in the trunk compartment in respect to the clamping means. The spare wheel can be first placed therein or the jack. After or before either one, or both, of these have been placed in the trunk compartment, the end 18 of the crank 8 is inserted through the perforation 11 in the jack base plate and then drawn through to abut the socket end 9 against the base plate. The end 18 of crank 8 is then inserted through the central wheel opening 4 to abut the jack base plate against one side of the wheel with its intermediate bent portion 17 against the side of the jack. The particular sequence of placing the wheel and the jack in the trunk is of no importance, and there is no particular sequence for assembling the crank and the jack base to the spare wheel.

From the foregoing description, it will be seen that a conventional motor vehicle lifting jack and its parts are utilized for clamping the spare wheel in the trunk without requiring anything more than some means for securing the jack in position on the trunk floor and latching the crank in clamping position. One end of the crank can be operatively connected with either the hub opening or one of the bolt openings through the wheel as desired to be fulcrumed against the jack that is fitted to the trunk floor.

I am aware that there may be various changes in details of construction without departing from the spirit of the invention, and therefore, I claim my invention broadly as indicated by the appended claims.

Having thus described my invention what I claim as new and useful and desire to secure by United States Letters Patent, is:

1. A clamping device for the spare wheel of a motor vehicle comprising a lifting jack detachably secured to a motor vehicle adjacent one side of the wheel, a combination bell crank and wrench for the jack having one end adapted to be temporarily pivoted to the wheel by an apertured plate for an intermediate off-set portion between its opposite ends to be fulcrumed to the jack, and means for latching the crank fulcrumed to said jack.

2. A clamping device for the spare wheel of a motor vehicle comprising a lifting jack crank having an enlarged end temporarily pivoted to the spare wheel by means of an apertured plate, and means fitted to the trunk of the motor vehicle adjacent one side of the spare wheel against which an intermediate portion of the crank is fulcrumed for clamping said wheel in position.

3. In combination with a motor vehicle and a spare wheel therefor, a clamping means comprising a lifting jack detachably fitted to the motor vehicle at one side of the wheel, a lifting jack crank having an intermediate offset portion detachably connected at one end to the wheel by an apertured plate with its opposite end disposed at the same side of the wheel as is the lifting jack, fulcrum means being provided by said lifting jack for the offset portion of the jack crank for clamping the wheel and lifting jack in place, and means for latching the jack crank in position.

4. In combination with the trunk compartment of a motor vehcile and a spare wheel mounted therein, a clamping means comprising a lifting crank detachably connected at one end to the wheel by means of one end thereof being fitted to the base of the lifting jack disposed on one side of the wheel spanning the hub opening therein and its opposite end projecting through the hub opening in the wheel to be disposed adjacent the side of the wheel opposite to the lifting jack base, a fulcrum means fitted to the compartment floor upon which the lifting jack crank is fulcrumed for clamping the wheel in place, and a latch for the end of the lifting jack crank for holding said crank in clamping position.

5. A clamping means for securing a spare motor vehicle wheel in the trunk compartment of a motor vehicle comprising a bell crank, with an intermediate off-set portion, having an enlarged end connected to the spare wheel by an apertured plate, a rigid elongated bar detachably secured in the trunk compartment in position to provide a fulcrum for the intermediate off-set portion of the bell crank and means for latching the crank in position.

6. The clamping means of claim 5 in which the said bell crank, apertured plate and elongated bar comprise parts of a jacking device.

7. A clamp means for securing a spare motor vehicle wheel in the trunk compartment of a motor vehicle comprising a bell crank, with an intermeidate off-set portion, having one end connected to the spare wheel by a plate, a rigid elongated bar detachably secured in the trunk compartment in position to provide a fulcrum for the intermediate off-set portion of the bell crank, and means for latching the crank in position.

8. The clamping means of claim 7 in which the said bell crank, plate and rigid elongated bar comprise parts of a jacking device.

References Cited in the file of this patent
UNITED STATES PATENTS 2,674,394     Hall et al.            Apr. 6, 1954
2,711,274     Stephens             June 21, 1955